United States Patent [19]
Ølbye et al.

[11] Patent Number: 5,775,890
[45] Date of Patent: Jul. 7, 1998

[54] PLANT FOR HEAT TREATMENT OF LUMPY MATERIAL

[75] Inventors: Bendt Ølbye; Bent Mærsk, both of Valby, Denmark

[73] Assignee: F. L. Smidth & Co. A/S, Denmark

[21] Appl. No.: 727,537

[22] PCT Filed: Jun. 1, 1995

[86] PCT No.: PCT/DK95/00216

§ 371 Date: Oct. 10, 1996

§ 102(e) Date: Oct. 10, 1996

[87] PCT Pub. No.: WO96/00703

PCT Pub. Date: Jan. 11, 1996

[30] Foreign Application Priority Data

Jun. 29, 1994 [DK] Denmark ................. 0775/94

[51] Int. Cl.$^6$ ........................................... F27B 15/00
[52] U.S. Cl. ................................. 432/58; 432/106
[58] Field of Search .................. 432/58, 14, 106

[56] References Cited

U.S. PATENT DOCUMENTS 5,193,997  3/1993  Aoyama et al. ................. 432/58
5,283,959  2/1994  Nagayoshi et al. .............. 432/58
5,289,920  3/1994  Godderidge et al. ............. 432/58
5,292,247  3/1994  Bauer ........................... 432/106
5,580,241 12/1996  Koeberle ........................ 432/58

FOREIGN PATENT DOCUMENTS 222044 12/1985 European Pat. Off. ......... F27B 7/20

*Primary Examiner*—Ronald C. Capossela
*Attorney, Agent, or Firm*—Baker & Botts, L.L.P.

[57] ABSTRACT

A description is given of a plant for heat treatment of lumpy material, such as limestone, other carbonate materials, cement raw materials, or the like. The plant comprises a preheating zone, a burning zone, and connecting means which connect the material outlet of the preheating zone to the material inlet of the burning zone. A separating device is provided as a part of the connecting means and consists of a duct through which a gas stream can be induced to flow from below and upwards. On entry into the separating duct at the top of the duct, the preheated material will be dispersed in the counterflowing gas stream, whereby the material is divided into a fine fraction which suspended in the gas can be discharged via the discharge means provided at the upper end of the duct, and a fall-through coarse fraction which is normal manner can be fed via a connecting means to the material inlet of the burning zone.

18 Claims, 2 Drawing Sheets

PLANT FOR HEAT TREATMENT OF LUMPY MATERIAL

BACKGROUND OF THE INVENTION

The present invention relates to a plant for heat treatment of lumpy material such as limestone, other carbonate minerals, cement raw materials, or the like, which plant comprises a preheating zone, preferably in the form of a shaft preheater, with at least one material inlet, at least one material outlet, at least one inlet for preheating gas, and at least one outlet for used preheating gas, in which preheating zone the material is preheated by means of hot preheating gas from which it is subsequently separated, a burning zone, e.g. in the form of a rotary kiln, with material inlet and outlet, for burning the preheated material, connecting means which connect the material outlet of the preheating zone to the material inlet of the burning zone, and a separating device fitted in connection with the connecting means for separating the finest particles from the preheated material.

When operating a plant of the aforementioned kind, the material leaving the preheating zone may contain a certain amount of fine material being produced either by decrepitation of the material during the preheating, or resulting from the material being exposed to wear or dust from the burning zone which is drawn along up to the preheating zone, subsequently settling there.

There are primarily two reasons why it is desirable to minimize the amount of this fine material before the preheated material is fed to the kiln. One reason is that the fine material may have a disturbing effect on the kiln operation because of dust generation and coatings in the kiln and/or in exhaust gas ducts connected thereto. The second reason is that the amount of substances which are undesirable in the finished product, and which have the strongest tendency to stick to the finest material fractions during the manufacturing process, can be reduced in this way.

As a case in point, it can be mentioned that the permissible sulphur content in lime which is utilized in the steel-making industry is normally specified to be 0.03 to 0.05%. It follows that the sulphur content in the lime product depends on the amount of sulphur being fed to the kiln plant via the raw materials and the fuel. The sulphur content in raw materials may range from approximately 0 to 0.5%, while the sulphur content in fuel types such as oil and coal may be as high as 5%. In the majority of cases it will, therefore, be necessary to remove sulphur from the manufacturing process in order to meet the requirements which apply in terms of sulphur content in the finished product. This can be done by removing the finest material fractions, since, in relative terms, these fractions absorb the highest amount of sulphur because of their greater surface area.

A known method for removing the finest material consists of simple mechanical screening where the finest material is screened off by means of a sorting grate installed in the duct for feeding of material to the kiln. The disadvantage of using such a sorting grate is, however, that clogging of the grate will occur within a relatively short period of time, which entails that the grate loses its function. This occurs particularly in cases where the preheated feed material to the kiln is fine. Another disadvantage is the attendant risk of deformation of the grate due to the temperature between 650° and 900° C. which prevails in this area.

SUMMARY OF THE INVENTION

It is the object of the present invention to provide a plant for heat treatment of lumpy material by means of which the aforementioned disadvantages are remedied.

This is achieved according to the invention by a plant of the kind mentioned in the introduction, and being characterized in that the separating device is provided as a part of the connecting means and consisting of a duct, with gas introducing means being provided at the lower end of the duct and with means for discharge of gas/material suspension being provided at the upper end of the duct, and in that the plant comprises means for generating a gas stream through the duct from below and upwards.

This involves that, on entry into the upper end of the separating duct, the preheated material will be dispersed in the counter-flowing gas stream, causing the material to be divided into a fine fraction which suspended in the gas can be discharged via the discharge means provided at the upper end of the duct, and a fall-through coarse fraction which in normal manner via a connecting means can be fed to the material inlet of the burning zone.

The separating duct may have a certain inclination, but the duct are preferably vertical.

In order to attain a satisfactory dispersion of the preheated material in the gas stream, and thus an effective sorting of the material, the separating duct should have an appropriate length, e.g. of two meters or more. To enhance further the dispersion and sorting of the material, a dispersion device may be provided in the separating duct, e.g. in the form of a spreader plate arrangement.

In plants of the mentioned kind it is standard practice that the exhaust gas is drawn through kiln, preheater and possibly a filter by means of a fan, and, as a consequence hereof, it follows that the means for generating a gas stream through the duct may also consist of a fan which is connected to the gas introducing means and/or gas/material discharge means of the separating duct. The same fan may be used for both purposes.

The gas stream velocity up through the separating duct, in conjunction with the characteristics of the material, is the main determinant for the limit of separation between particle sizes which are entrained by the gas and the particle sizes which fall through. In order to incorporate into the plant a certain degree of flexibility both as regards the capability of handling different types of material and the ability to vary the limit of separation between the particles which entrained in the gas end up in the fine fraction and the fall-through particles which end up in the kiln, the plant may include means for regulating the gas velocity through the separating duct.

These means for regulating the gas velocity may comprise the fan which provides for the movement of the gas through the separating duct, particularly if the fan is not the same as that which is used to draw the exhaust gas through the plant. It is further preferred to use dampers for speed regulation.

The gas which is used for the separation process may theoretically be taken from many different sources. It may be taken from the atmosphere as cold, atmospheric air, from the kiln as exhaust gas, from the exhaust gas duct of the preheater as exhaust gas used for preheating, or if a shaft preheater is used from this in the form of air used for cooling hereof. Hot excess air may also be used, for example the hot cooling air from a product cooler fitted after the kiln. Furthermore, the used separating gas may optionally be recirculated.

If the separating gas is taken as cold, atmospheric air it will exchange heat with the preheated material during the separation process and will be heated to a temperature of 450°–650° C. The heat loss thereby incurred depends on this temperature and the amount of air taken in. However, a substantial reduction of the heat loss can be achieved by recirculating the air after a separation of the from the separating duct entrained particles, and supplementing only with new atmospheric air to the extent necessary.

If the separating gas is taken as exhaust gas from the kiln, it may either be drawn up through the material feed duct, be taken from the smoke chamber of the kiln, or from the exhaust gas ducts which connect the smoke chamber to the preheater. The exhaust gas temperature will typically lie within the range 700°–1200° C., and, as a consequence hereof, the heat loss will be relatively large. By recirculating the exhaust gas in the way mentioned above after a separation of the from the separating duct entrained particles and by adding only new exhaust gas to the extent necessary, a substantial reduction in the heat loss can, however, be achieved.

If the separating gas is taken from the exhaust gas outlet duct of the preheater it may either be taken immediately after the preheater or after cleaning the exhaust gas in a subsequent filter. The temperature of this exhaust gas will typically range between 200° and 350° C. and, therefore, it will be advantageous to use it for the separation, partly because it has an appropriately high temperature to prevent substantial cooling of the material in the separating duct, and partly because its heat content anyhow will be lost.

The air which is used for cooling a shaft preheater is exhausted at several locations, and, consequently, from a viewpoint of economy/design it will be less interesting to use this air.

Therefore, it is preferred that the plant according to the invention comprises means, such as dampers, for introducing atmospheric air into the separating duct and/or means, such as pipelines and dampers, for supplying kiln exhaust gas from either the kiln or from the exhaust gas discharge duct of the preheater into the separating duct.

The fine material fraction which entrained in the separating gas is discharged from the separating duct must be separated from the gas before the latter is either vented to the atmosphere or returned to the separating duct. Accordingly, the plant should incorporate separating means for separating the material from the discharged gas/material suspension.

The separating means may consist of a separation cyclone and/or a dedusting filter. As a dedusting filter a bag filter may be used for separating the fine particles from the gas. However, the temperature of the gas/material suspension will typically be so high, in range between 400° and 600° C., that cold air must be added before the bag filter, hence requiring a bigger filter. An electrostatic precipitator which is normally incorporated in plants of the mentioned kind for cleaning of the exhaust gas, may also be used as a dedusting filter. The amount of fine material being removed from the process by the plant according to the invention may, however, be relatively substantial, and, therefore, there may be a risk of the dedusting filter being overloaded. Further, it is not necessarily advantageous to mix the dust separated from the exhaust gas with the fine material extracted from the separating gas. It is, therefore, generally preferred that the gas/material suspension from the separating duct is initially led to a separation cyclone in which the majority of the fine material is being separated. The separating gas with the remaining amount of fine material may subsequently be vented either to the dedusting filter or recirculated direct to the separating duct. If the separating gas is vented to the dedusting filter where it will be mixed with the exhaust gas coming from the preheater, a certain amount of this mixed gas may be circulated to the separating duct. Therefore, the plant may incorporate means, such as pipelines, for recirculating the gas from the separation cyclone and/or the dedusting filter back to the separating duct.

BRIEF DESCRIPTION OF THE DRAWINGS

The invention will now be described in further details with reference to the drawing, being diagrammatical, and where.

DESCRIPTION OF THE PREFERRED EMBODIMENTS

Figure 1:
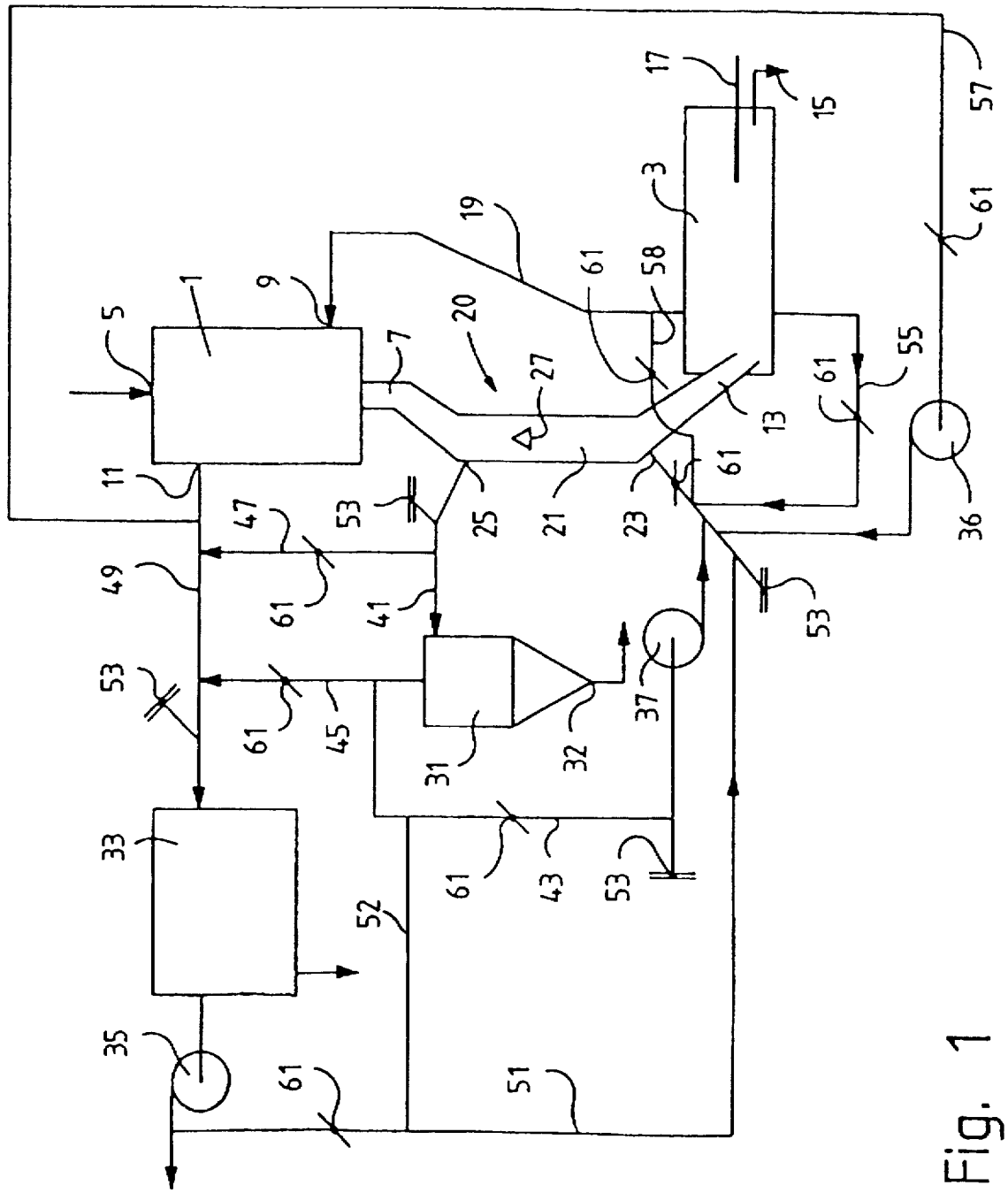
FIG. 1 shows an example of a plant according to the invention.

The plant shown in FIG. 1 comprises a preheater 1 and a kiln 3. The preheater which is preferably a shaft preheater has a material inlet 5, a material outlet 7, an inlet 9 for preheating gas and an outlet 11 for used preheating gas. The kiln 3, which may be a rotary kiln, comprises a material inlet 13 and a material outlet 15. Furthermore, the kiln comprises a burner 17. The gas which is used to preheat the material which is to be treated is normally exhaust gas which from the kiln 3 is led to the preheater via one or several ducts 19.

The preheated material is led from the preheater 1 to the kiln 3 via a feed duct 20. According to the invention a part of this feed duct 20 is configured as a preferably vertical gas separating duct 21 through which a separating gas flows from below and upwards. The separating gas is introduced via an opening 23 fitted at the bottom of the duct 20 and then flows up through the duct 20 at a specified velocity, whereby it captures and entrains the finest particles in the counter-flowing kiln feed material. The gas/material suspension thereby formed is discharged via an opening 25 at the top of the duct 20.

In order to attain a satisfactory dispersion and sorting of the material, a dispersion device 27 is fitted in the separating duct 20 in the form of a spreader plate arrangement to ensure that the material is effectively dispersed in the gas stream.

The shown plant further comprises a separation cyclone 31, a dedusting filter 33, and fans 35, 36 and 37 for drawing the various gas streams through and/or around in the plant.

In FIG. 1 there are several alternatives both with respect to the routing of the discharged gas/material and as regards the extraction points of the gas being used as a separating gas. In actual practice, the plant must not necessarily incorporate all the shown alternatives.

The gas/material suspension may be directed from the separating duct 21 via a duct 41 to the separation cyclone 31 in which most of the material is separated and diverted via an opening 32. From the separation cyclone the gas may either be recirculated via a duct 43 and the fan 37 to the separating duct or directed via a duct 45 to the exhaust gas outlet duct 49 of the preheater 1, in which, mixed with the exhaust gas from the preheater 1 and by means of the fan 35, the gas is vented to the dedusting filter 33. The cleaned gas discharged from the dedusting filter may either be vented to the atmosphere or via a duct 51 and/or 52 circulated to the separating duct 31. Alternatively, the gas/material suspension may via a duct 47 and the duct 49 be vented direct to the dedusting filter.

The separating gas may be taken from the exhaust gas outlet duct 49 of the preheater 1, and be directed via a duct 57 and the fan 36 to the separating duct 21. The separating gas may also be taken from the kiln 3 and directed either via a duct 55 or via the material feed duct to the separating duct. Further, the separating gas may be taken from one or several of the ducts 19 and directed to the separating duct via a duct 58. A further possibility is to introduce the gas as atmospheric air which can be done via damper 53. During operation of the plant, it may be desirable to use as separating gas a gas which is recirculated from the dedusting filter 33 via the duct 51 and/or from the separation cyclone 31 via the duct 43 and to use additional separating gas from the aforementioned possibilities only on a supplemental basis or for regulation of the operating conditions, including the temperature of the separating gas.

For regulation of the gas streams in the various ducts, these ducts are provided with dampers 61.

Figure 2:
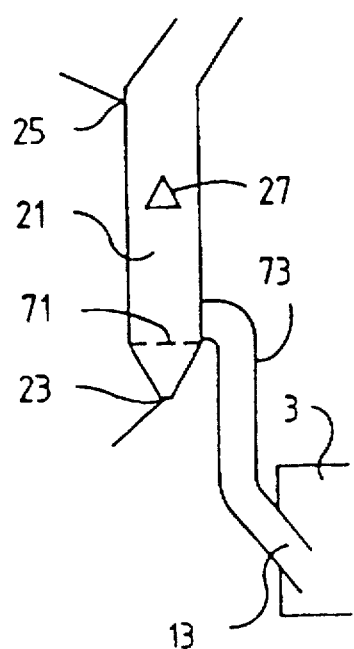
FIG. 2 shows an alternative to the plant depicted in FIG. 1.

In some plants which handle material types where the finest material tends to stick to the larger lumps of material and thus being less easily suspended and entrained in the separating gas in the separating duct, it may be advantageous, as shown in FIG. 2, to install an air-permeable bottom plate 71 in the separating duct, so that the operating principle of the latter corresponds to that of a fluid bed. As a result, the retention time of the material in the separating duct will be increased, causing a greater portion of the finest material to be entrained by the separating gas. In this embodiment, it will be impossible for the coarse material to fall through, and, consequently, it must be extracted from the side of the separating duct via means 73 provided for this purpose, subsequently being directed to the material inlet of the kiln.

We claim:

1. A plant for heat treatment of lumpy material such as limestone, other carbonate materials or cement raw materials, said plant comprising a preheating zone and a burning zone, said preheating zone having at least one material inlet, at least one material outlet, at least one inlet for preheating gas, and at least one outlet for used preheating gas, the material in said preheating zone being preheated by means of hot preheated gas from which the material is subsequently separated, said burning zone having a material inlet for preheated material from the preheating zone and a material outlet for material burned in the burning zone, said plant further comprising connecting means for connecting the material outlet of the preheating zone to the material inlet of the burning zone, said connecting means including a separating device for separating finer particles from courser particles in the preheated material, said separating device comprising a separating duct having an upper end and a lower end, gas introducing means in the lower end of the duct and gas/material discharge means at the upper end of the duct, and means for generating a gas strewn from the gas introducing means through the duct and out of gas/material discharge means such that finer particles in the preheated material are suspended in the gas stream and carried out of the gas/material discharge means.

2. A plant according to claim 1, wherein the separating duct is vertical.

3. A plant according to claim 1 or 2, wherein a dispersing device is provided in the separating duct.

4. A plant according to claim 3, wherein the dispersing device is in the form of a spreader plate arrangement.

5. A plant according to claim 1 or 2, wherein the means for generating a gas stream through the duct comprises a fan which is connected to the gas introducing means.

6. A plant according to claim 1 or 2, said plant including means for regulating the gas velocity through the separating duct.

7. A plant according to claim 6, wherein the means for regulating the gas velocity comprises at least one damper.

8. A plant according to claim 6, wherein the means for regulating the gas velocity comprises a fan.

9. A plant according to claim 1 or 2, further comprising means for introducing atmospheric air into the separating duct.

10. A plant according to claim 9, wherein said means for introducing atmospheric air comprises at least one damper.

11. A plant according to clam 1 or 2, further comprising means for introducing kiln exhaust gas from at least one of a smoke chamber of the kiln, an exhaust gas duct which connects the smoke chamber of the kiln and the preheater and an exhaust gas duct into the separating duct.

12. A plant according to claim 1 or 2, further comprising separating means for separating the suspended material from the discharged gas/material suspension.

13. A plant according to claim 12, wherein the separating means comprises at least one of a separation cyclone, a dedusting filter, an electrostatic precipitator or a bag filter.

14. A plant according to claim 13, characterized in that it incorporates means, such as pipelines, for recirculating the gas back to the separating duct.

15. A plant according to claim 13, wherein said plant incorporates means for recirculating the gas back to the separating duct.

16. A plant according to claim 12 wherein said plant incorporates means for recirculating the gas back to the separating duct.

17. A plant according to claim 1 or 2, wherein an air-permeable bottom plate is fitted in the separating duct so that the operating principle of the separating duct corresponds to that of a fluid bed, and in that means are provided in the side wall of the separating duct for extraction of coarse material deposited on the bottom plate.

18. A plant according to claim 1 or 2, wherein the means for generating a gas stream through the duct comprises a fan which is connected to the gas/material discharge means of the separating duct.

* * * * *